United States Patent [19]

Stringer et al.

[11] Patent Number: 4,491,018

[45] Date of Patent: Jan. 1, 1985

[54] PIG DETECTOR

[75] Inventors: Jackie D. Stringer; Eugene L. Dobesh, both of Houston, Tex.

[73] Assignee: F. H. Maloney Company, Houston, Tex.

[21] Appl. No.: 505,209

[22] Filed: Jun. 17, 1983

[51] Int. Cl.³ .................... H01H 35/00; H01H 36/00
[52] U.S. Cl. ...................... 73/432 R; 73/3;
200/61.41; 200/61.42; 335/205
[58] Field of Search ................ 73/432 R, 432 V, 3;
200/61.41, 61.42; 335/205, 207

[56] References Cited

U.S. PATENT DOCUMENTS 3,012,116 12/1961 Boylan et al. .................. 335/205
3,465,327 9/1969 Schroter et al. ................ 335/205

Primary Examiner—S. Clement Swisher
Attorney, Agent, or Firm—David Alan Rose; David S. Wise; William E. Shull

[57] ABSTRACT

The present invention includes a ferrous conduit mounted over an aperture in the pipeline, launch tube, or receiver through which the pigs pass. A non-magnetic sensing rod is reciprocally mounted within the conduit with the rod extending through the aperture and into the pipeline. That end of the non-magnetic sensing rod extending into the pipeline has attached thereto a head with a lower rounded surface for engaging the pigs. A non-magnetic end cap is secured to the upper end of the conduit and a non-magnetic magnet holder with a magnet disposed therein are mounted on the upper end of the rod. A magnetically operated switch is mounted adjacent the non-magnetic cap. The conduit shields the magnetic field of the magnet from the switch until a pig is detected. Upon the engagement of the head with a pig, the magnet on the upper end of the sensing rod moves above the conduit inside the non-magnetic cap and sends a magnetic flux to the magnetically operated switch. The switch is activated and sends a signal to a remote location indicating the presence of a pig.

10 Claims, 13 Drawing Figures

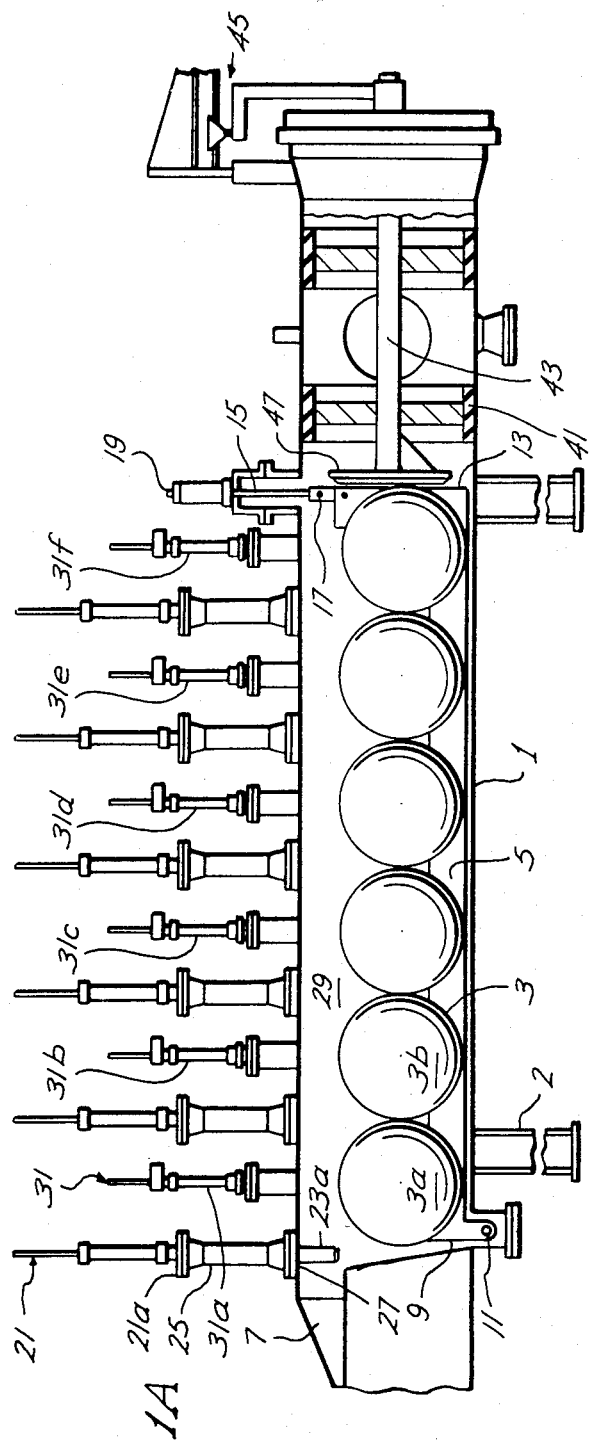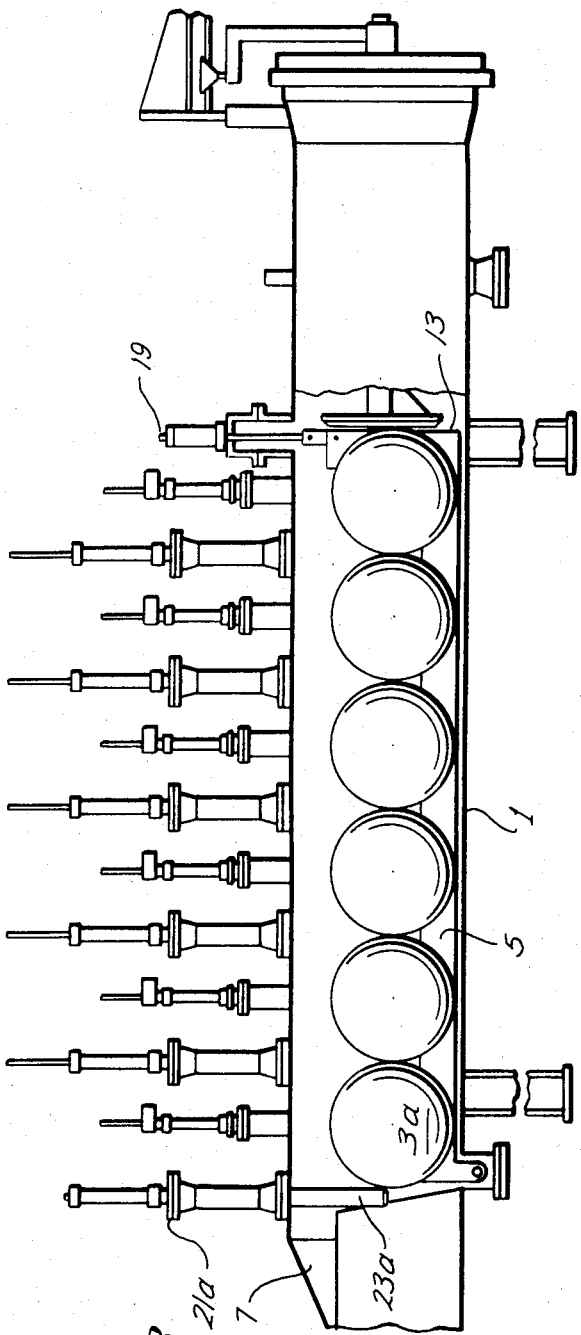

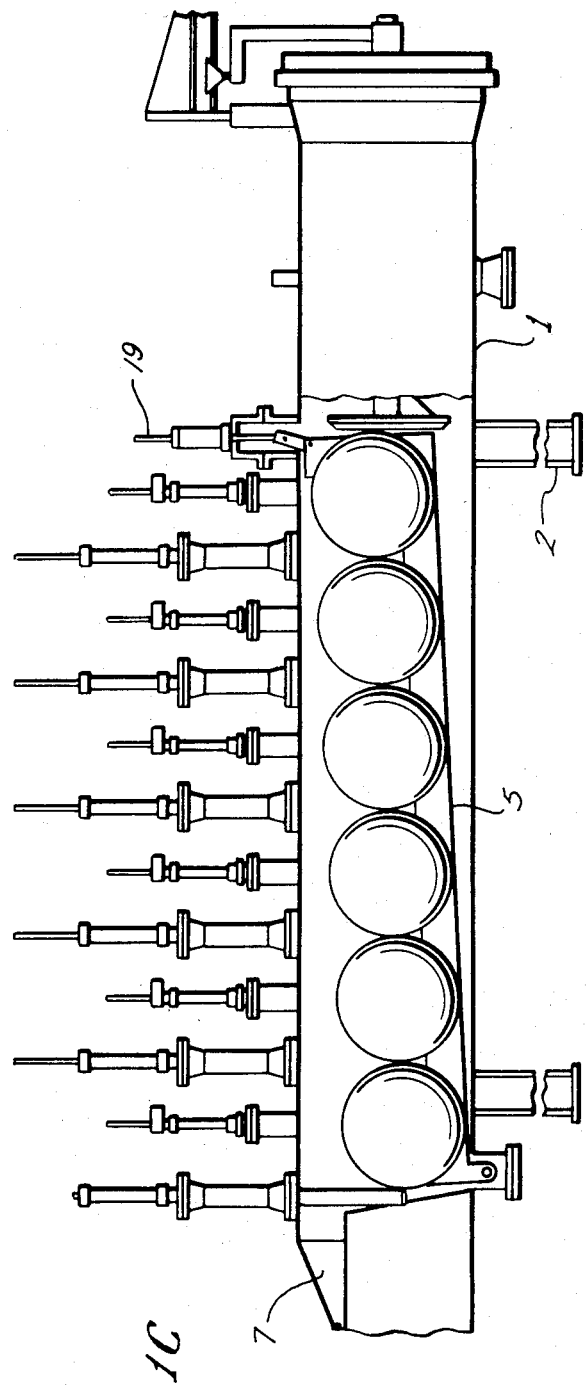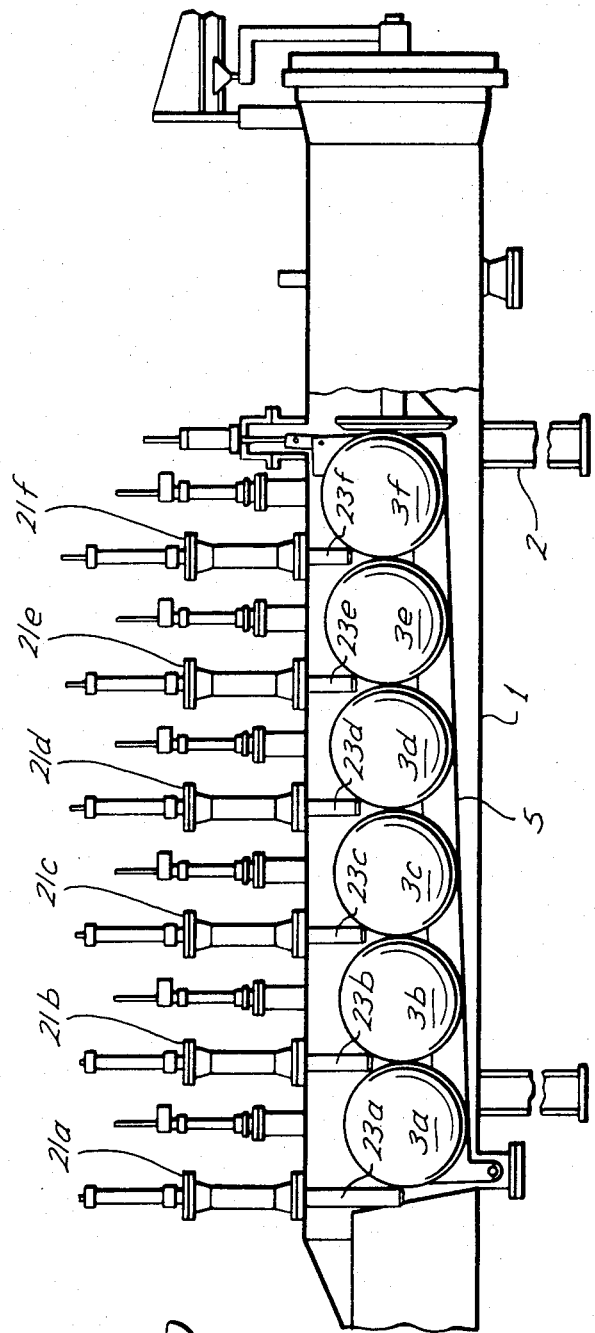

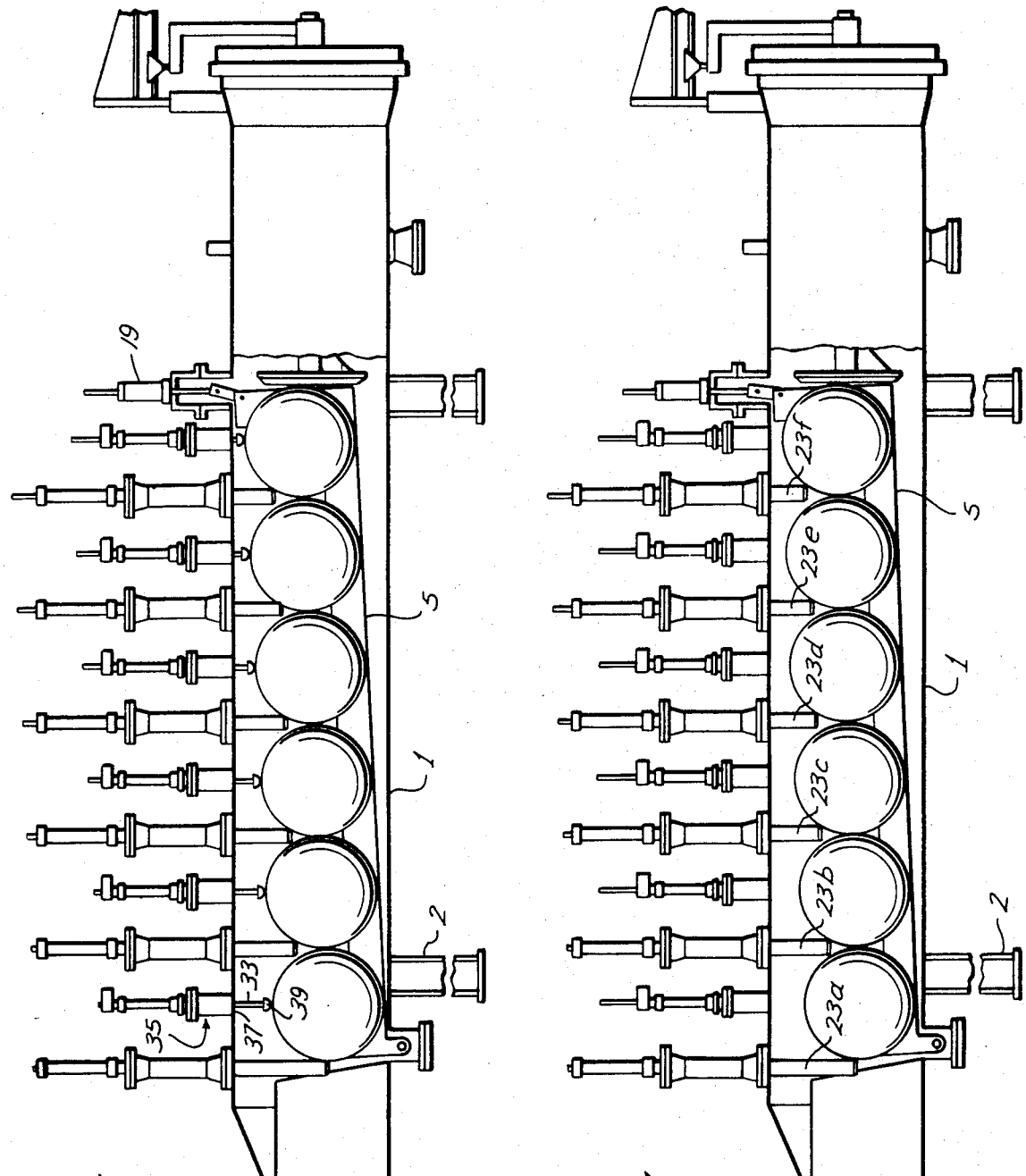

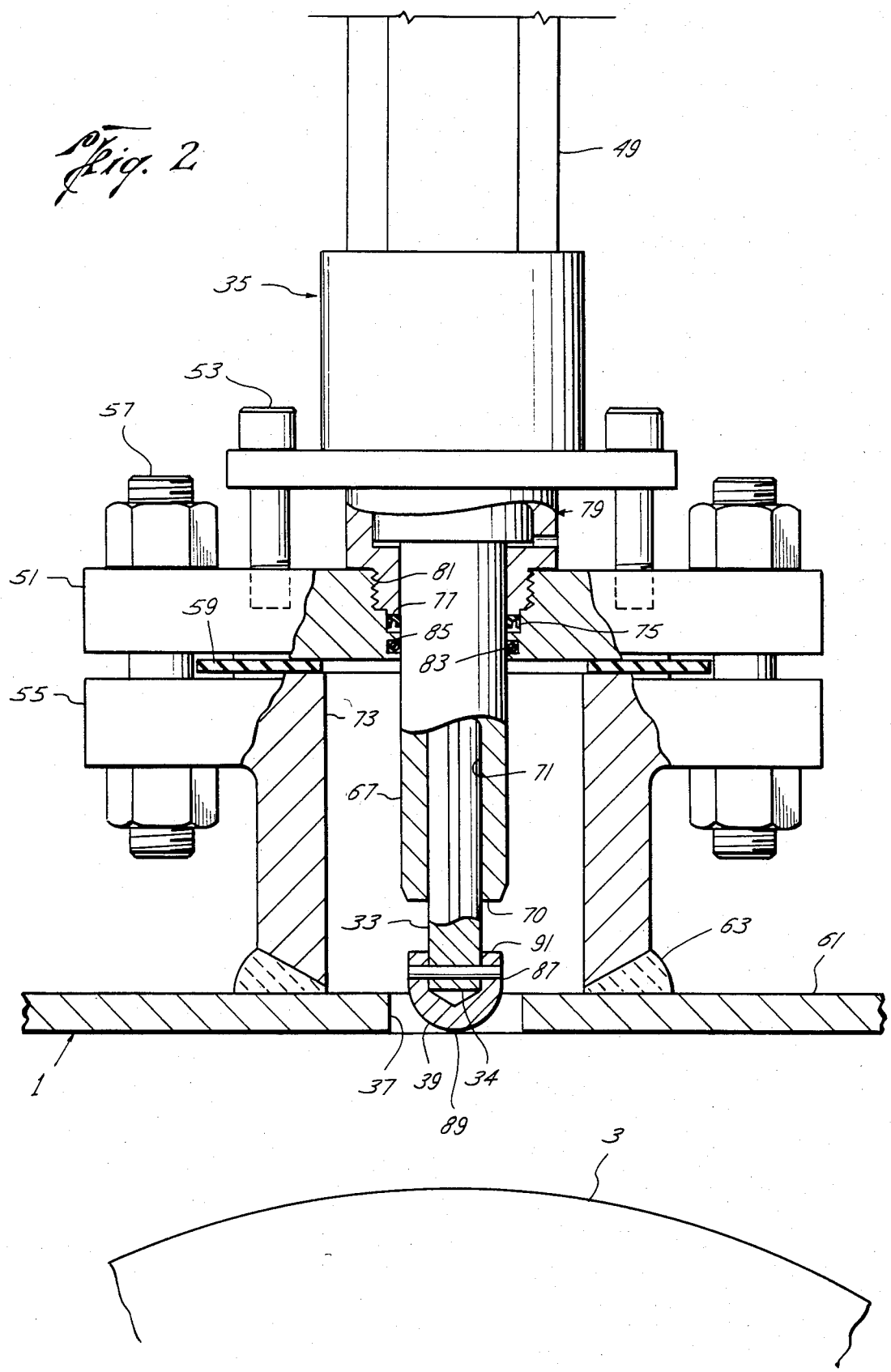

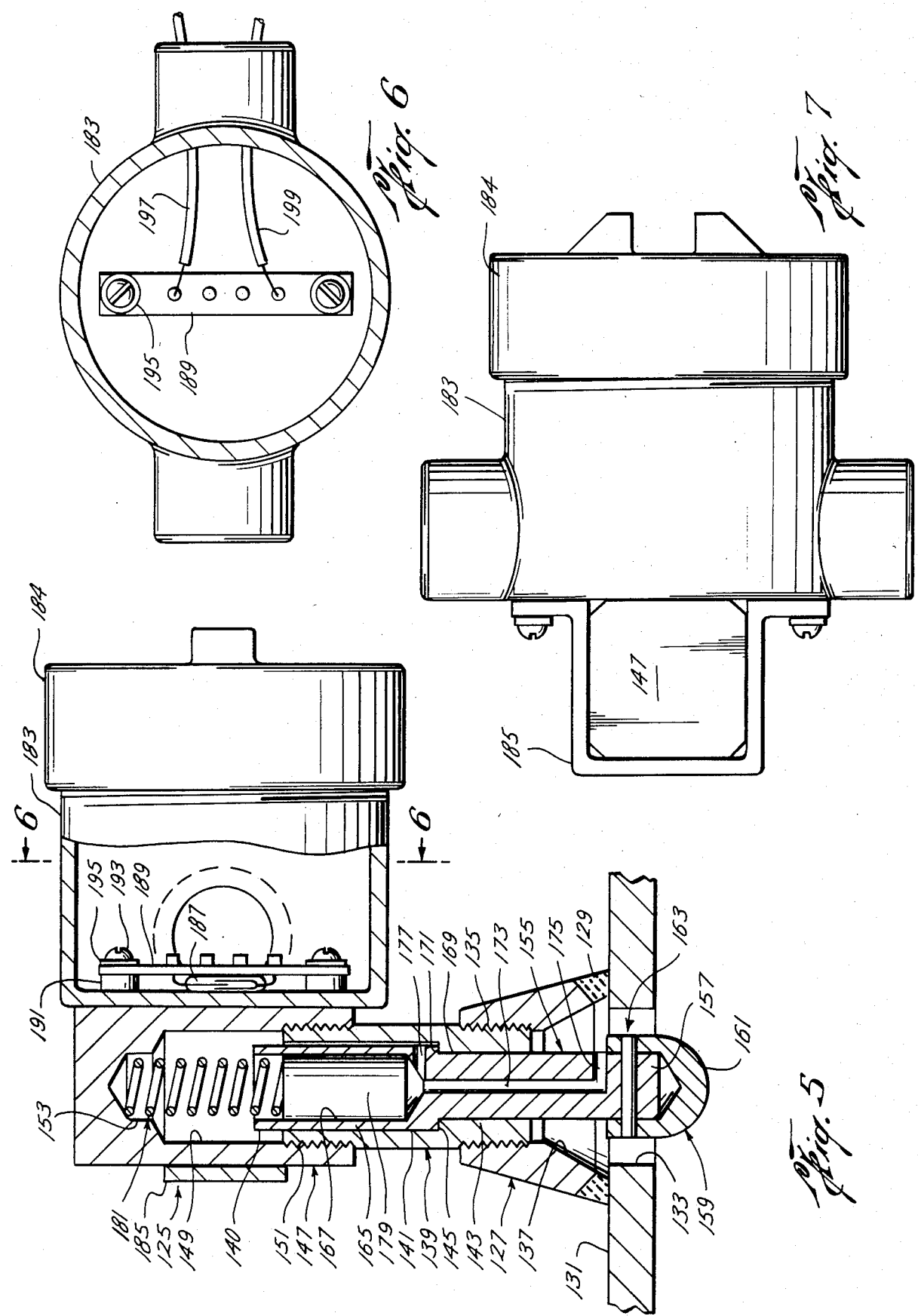

PIG DETECTOR

BACKGROUND OF THE INVENTION

This invention relates to pipeline pig detectors and more particularly to an improved apparatus and method for verification of the position and location of a pig or sphere within a pipeline.

A solid object such as a sphere or scraper, introduced into a pipeline and propelled by the fluid flowing therein, is commonly called a pig. It is sometimes necessary to detect the presence or position of a pig for various reasons. Typically, pig detectors employ a mechanical sensing means, such as a movable trigger, to contact the pig. The trigger is mechanically coupled to a reporting means, such as a switch or valve, and is adapted to actuate this reporting means when the trigger is moved by the pig. Excellent examples of pig detectors are disclosed in U.S. Pat. Nos. 3,145,274 and 4,079,619. Such detectors adequately perform the gross function of reporting the approximate location of a pig in the pipeline.

In the pipeline industry, it is common practice to employ batching pigs (or spheres) for separating two different fluids being successively transmitted through the pipeline. These pigs are first loaded into a specially designed oversized portion of the pipeline to permit ease of loading and controlled launching. To verify that the pig did indeed launch into the flowing pipeline, detectors such as those disclosed in U.S. Pat. Nos. 3,145,274; 3,421,124; and 3,109,410 are mounted on the pipeline a short distance from the oversized launcher and are triggered by the passage of the pig to cause an indication.

When the pig reaches the end of a run, it enters another specially designed oversized portion of the pipeline, commonly called a receiver. A detector, similar to those cited above, is usually mounted on the pipeline just before the oversized receiver to indicate the arrival of the pig into the receiver.

In many instances, the pipeline will be required to operate bi-directionally, such as in tanker or barge loading and unloading, in which case the specially designed oversized ends of the pipeline function as pig launchers as well as pig receivers.

Many installations are now in use where a plurality of pipeline spherical pigs are controlled by retractable restraining pins. The operation of the pin mechanism is usually semi-automatic, being controlled by push-button operation at a location remote from the launching or receiving barrels. For this type of operation, reliable pig passage indication is most important. Often multiple detectors are incorporated when using detectors such as in U.S. Pat. No. 3,421,124, or a plurality of indicators are employed such as in the use of detectors shown in U.S. Pat. No. 3,145,274. In the event of a detector indication failure, which could be caused by a mechanical malfunction, electrical power failure, or even operator error or carelessness in resetting equipment, a pig can become "lost" in the system, and personnel must be dispatched to the launcher or to the receiver to close off the system from the stream, drain and open the unit and physically inspect to determine if the pig or pigs are in the barrel.

The installation of detectors, such as shown in U.S. Pat. No. 3,109,410, on the oversized launching and receiving chambers has been used as a secondary verification in an effort to circumvent the previously stated problems. These installations have not been successful as oscillations of the pig (especially in the case of spherical pigs) in the oversized launcher or receiver, caused by the flowing median, can cause multiple indications and even break the extended indicator trigger.

Present state-of-the-art computer controlled batch separating systems rely on electrical signals from the launching and receiving barrels which are classified as hazardous areas, and electrical wiring is preferred to be installed in rigid metal conduit at these locations. Electrical wiring must be housed in flexible explosion-proof conduits which have extreme bulk and relative stiffness thereby rendering their use impractical with pig detectors. The use of very low voltage/current "intrinsically safe" electrical systems for wiring to the switch contacts in a pig detector would require the flexing of this wiring as the detectors are inserted and retracted thereby eventually causing a failure of the wire. Further, the wire would be exposed and subjected to external damage.

Soft foam pigs are used in some pipeline applications. Prior art detectors are insufficiently sensitive to detect such soft foam pigs.

The method and apparatus of the present invention overcomes the deficiencies of the prior art.

SUMMARY OF THE INVENTION

According to the present invention, a ferrous conduit is mounted over an aperture in the pipeline, launch tube, or receiver through which the pigs pass. A non-magnetic sensing rod is reciprocally mounted within the conduit with the rod extending through the aperture and into the pipeline. That end of the non-magnetic sensing rod extending into the pipeline has attached thereto a head with a lower rounded surface for engaging the pigs. A non-magnetic end cap is secured to the upper end of the conduit and a non-magnetic magnet holder with a magnet disposed therein are mounted on the upper end of the rod. A magnetically operated reed switch is mounted adjacent the non-magnetic cap. The conduit shields the magnetic field of the magnet from the reed switch until a pig is detected. Upon the engagement of the head with a pig, the magnet on the upper end of the sensing rod moves above the conduit inside the non-magnetic cap and sends a magnetic flux to the magnetically operated reed switch. The reed switch is activated and sends a signal to a remote location indicating the presence of a pig. Accordingly, the present invention utilizes the novel method of shielding magnetic forces until a controlled action releases the shield to enable the magnetic forces to close an electrical switch contact.

Accordingly, one object of the present invention is the detection of the passage of all forms of pipeline pigs such as scrapers, pigs or soft-foam pigs, without regard to the direction of travel, or the hardness or softness of the material of which the pig is made.

Another object of the present invention is the incorporation of an apparatus for installing the unit on a pipeline in the field and permitting subsequent removal for inspection or repair and reinstallation without the necessity of interrupting the operation of the pipeline.

A further object of one embodiment of the present invention is the provision of an apparatus which is pressure-balanced so that the rod is not subjected to a loading due to the pressure in the pipeline to which the conduit is attached. This feature allows the use of a very light spring, or mere gravity alone, to return the rod, permitting such slight actuating force requirement that the detector can operate even when very soft-foam pigs are being used.

Another and still further object of this invention is the provision of an apparatus which offers maintenance or trouble-shooting advantages whereby the mechanical action of the apparatus can be readily observed and the reed switch actuation can be easily tested by holding a small hand-held magnet in proximity of the housing for the switch without opening the housing cover or exposing any part of the electrical system.

Another object of one embodiment of the present invention is the provision of an apparatus with a conduit, i.e. pipeline fluid pressure bearing portion, being of a compact size such that it can be readily installed on an operating pipeline using known hot-tapping techniques. The reed switch can be installed after the conduit is in place.

Other objects and advantages of the present invention will appear from the following description.

BRIEF DESCRIPTION OF THE DRAWINGS

For a detailed description of a preferred embodiment of the invention, reference will now be made to the accompanying drawings wherein:

FIGS. 1A to 1F are elevations, partly in section and with some parts broken away, of a pig launching-/receiving tube incorporating the first embodiment of the detectors of the present invention, and illustrate generally the operation of the tube and use of the first embodiment of the present invention for detecting the presence of pigs in the tube in order to verify that the desired number of pigs are present for launching into the pipeline;

FIG. 2 is an elevation, partly in section and with some parts broken away, of the lower portion of the first embodiment of the detector of the present invention installed on top of the tube shown in FIGS. 1A to 1F, with its sensing rod and tip retracted from the interior of the tube above a pig preparatory to being extended into the interior of the tube to detect the presence of the pig;

FIG. 5 is a vertical section, with some parts in elevation and some parts broken away, of the second embodiment of the detector of the present invention installed on a pipeline for operation as a pig passage indicator;

FIG. 6 is a section of part of the apparatus shown in FIG. 5, taken along lines 6—6 of FIG. 5;

FIG. 7 is a top or plan view of the second embodiment of the detector of the present invention shown in FIG. 5;

FIG. 9 is a top or plan view of the third embodiment of the detector of the present invention shown in FIG. 8.

DESCRIPTION OF THE PREFERRED EMBODIMENTS

Figure 4:
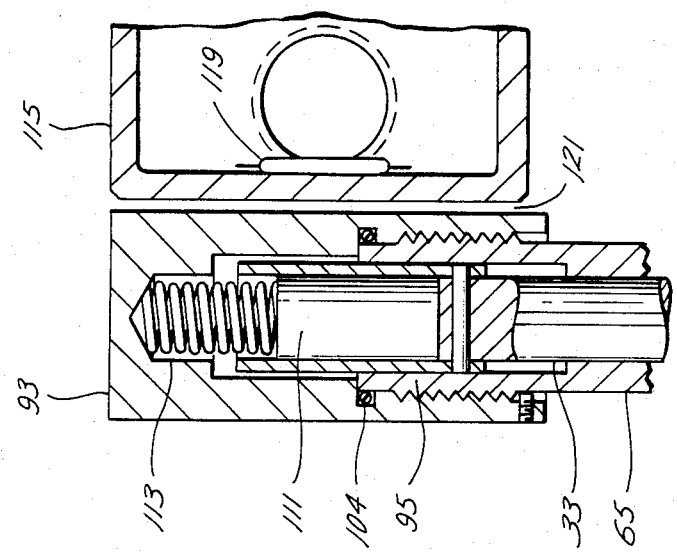
FIG. 4 is a fragmentary, vertical section of part of the upper portion of the first embodiment of the detector of the present invention shown in FIG. 3, after the sensing rod and tip shown in FIG. 2 have been extended into the interior of the tube and engaged with a pig in the tube.
Figure 3:
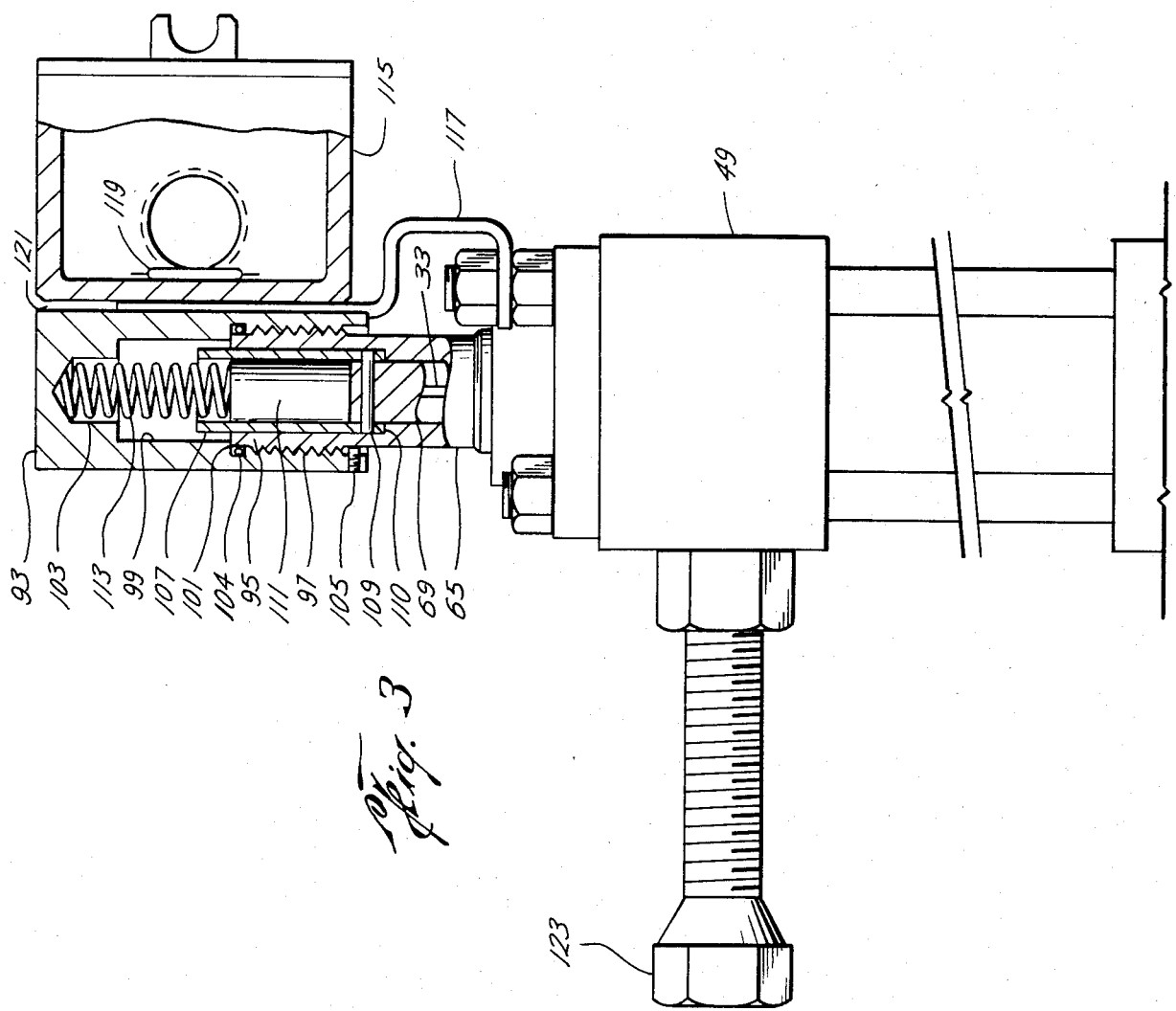
FIG. 3 is an elevation, partly in section and with some parts broken away, of the upper portion of the first embodiment of the detector of the present invention, after the sensing rod and tip shown in FIG. 2 have been extended into the interior of the tube, but with no pig present to be detected.

The first embodiment of the pig detector according to the present invention is used on a pig launching-/receiving tube to detect the presence of such pigs in the tube in order to verify that the desired number of pigs are present for launching into the pipeline. FIGS. 1A to 1F illustrate generally the operation of such a tube incorporating the first embodiment of this invention, and FIGS. 2, 3 and 4 illustrate the first embodiment in more detail.

Referring to FIGS. 1A to 1F, there is shown a pipeline pig launching/receiving tube 1 disposed on supports 2 and in which are disposed a plurality of pigs 3 on a tiltable tray 5. A pig is a solid object introduced and passed through the tube or pipeline and may be a sphere, a scraper with cups, or a cylindrically shaped solid foam member. For this particular application, the pig is a sphere. Tray 5 is a U-shaped trough along which pigs 3 may roll into or out of tube 1 by means of opening 7 in pipe 8 which is the same size as the pipeline. Tray 5 is pivotally attached to tube 1 at one end 9 by means of a hinge 11, and at its other end 13 to an actuator rod 15 by means of a clevis 17. Actuator rod 15 is attached to a tray actuator 19 disposed on top of tube 1. Tray actuator 19 operates to alternately lift actuator rod 15 thereby raising end 13 of tray 5 and tilting the tray toward opening 7, and to lower rod 15 thereby returning tray 5 to the horizontal.

On top of tube 1 are disposed a plurality of computer-actuated pin mechanisms 21 having pins 23 telescopingly received in pin housings 25. Pins 23 extend through holes 27 in the top of tube 1 into the interior 29 of the tube. Pins 23 are vertically extendable and retractable into the interior of the tube. Pin mechanisms 21 are spaced along the length of the tube at a distance which is about equal to the diameter of the pigs. Pin mechanism 21a is placed near opening 7 of tube 1 such that when a pig 3a is on tray 5 at end 9 thereof, and pin 23a is extended, pin 23a abuts the front face of pig 3a (see FIG. 1B). Similarly, when a second pig 3b is on tray 5 abutting pig 3a in its above described position, pin 23b of pin mechanism 21b in its extended position abuts an upper front surface of pig 3b (see FIG. 1D). In like manner, when additional pigs 3c, 3d, 3e, and 3f are in position on tray 5 in abutting relationship and pigs 3a, 3b are in their positions as described above, pins 23c, 23d, 23e, and 23f of pin mechanisms 21c–21f, respectively, in their extended positions abut an upper front surface of the respective pigs 3c–3f (FIG. 1D).

Pig detectors 31, including detectors 31a–31e, according to the first embodiment of this invention are disposed on top of tube 1 between pin mechanisms 21a–21f, respectively, and are also spaced from one another at a distance about equal to the diameter of the pigs. An additional pig detector 31f, also according to the first embodiment of this invention, is disposed on top of tube 1 between pin mechanism 21f and tray actuator 19. Detector 31f is also spaced from detector 31e at a distance about equal to the diameter of a pig. Referring to FIG. 1E, detectors 31a–31f each have a sensing rod 33 telescoped within a detector housing 35. Sensing rods 33 extend through holes 37 in the top of tube 1 into the interior 29 of the tube. Rods 33 are each extendable and retractable into the interior of tube 1, as will be described below. Rods 33 each have a sensing head or tip 39 on their lower ends. Detectors 31 are disposed along the length of tube 1 such that when a pig 3 is in its proper position on tray 5, it will be substantially centered below a detector 31. As will be described in more detail below, when such a pig is in its proper position on tray 5 and the detector above it is actuated to extend that detector's rod 33 into the tube, its head 39 will engage the top of the pig and the detector will actuate a communicating means connected to that detector which will send a signal to a remote location by which the presence of the pig in the tube can be detected from that remote location. If, on the other hand, there is no pig below a particular detector and that detector's rod and head are extended into the tube, the communicating means connected to that detector will not be actuated and no signal will be sent to the remote location. The absence of such signal at the remote location indicates the absence of a pig in the tube below that detector.

FIG. 1A illustrates tube 1 in its pig receiving mode. Although pin 23a is shown extending into the interior of the tube, it does not interfere or inhibit the pigs from entering tube 1 from pipe 8 during the pig receiving mode. Tray 5 is in its lowered or horizontal position, and all pins 23 and sensing rods 33 are retracted. Thus, pigs 3 are free to enter tube 1 from the pipeline through opening 7. As each pig enters tube 1, fluid pressure in the tube moves it toward end 13 of tray 5. Centralizers 41 are disposed at the end of tube 1 opposite opening 7 for centrally supporting an axial rod 43. A plate 47 is attached to the end of rod 43 inside the tube to act as a travel stop for pigs 3.

When it is desired to use the tube in its pig launching mode, pin 23a is extended to prevent pigs 3 from moving out of the tube through opening 7 (see FIG. 1B). Pin 23a is longer than pins 23b-f. Tray actuator 19 may then be actuated to raise end 13 of tray 5 and tilt tray 5 toward opening 7 (see FIG. 1C). This tilting of tray 5 causes pigs 3 to roll toward opening 7 when they are released and properly positions pigs 3 beneath detectors 31. Pins 23b-23f are then extended into the tube to engage pigs 3b-3f, respectively (FIG. 1D), in order to separate the pigs and permit launching of the pigs in sequence. Rods 33 of detectors 31 are then extended into the tube (FIG. 1E) so that sensing heads or tips 39 engage the pigs, if present, actuating the communicating means attached to the detectors and transmitting an appropriate signal to the remote location where the signal is received and the presence of the respective pigs confirmed. If no signal is received at the remote location corresponding to any of the detectors, then the rod 33 and tip 39 of that detector or detectors has not engaged a pig. Depending on the number of pigs it is desired to launch, the presence of an adequate number of pigs in the tube is thus easily ascertained by counting the number of signals received at the remote location. If ready for launching, that is, the required number of pigs in the tube has been detected, the rods 33 of detectors 31 are retracted (FIG. 1F). Pigs 3 are then released in sequence into the pipeline by sequential retraction of pins 23a-23f. If too few pigs are detected, the pins and sensing rods can be retracted, the tray lowered, and the requisite additional pigs inserted into the tube, and the above sequence of readying the tube for launching, and confirming its readiness, repeated.

Referring now to FIGS. 2, 3, and 4, the first embodiment of the pig detectors 31 of the present invention will be described in more detail. Since all the detectors 31a-31f are identical, only one need be described, and it will be understood that such description will be applicable to the others. The upper portion of this embodiment is shown in FIG. 3 and partially in FIG. 4, and the lower portion is shown in FIG. 2. Detector housing 35 includes a double rod end hydraulic cylinder 49 mounted to a flange plate 51, as by cap screws 53. Flange plate 51 is mounted on a flanged base 55, as by studs and nuts 57, with a flange-type gasket 59 therebetween. Base 55 is welded to the top 61 of tube 1, as shown at 63.

Double rod end hydraulic cylinder 49 has an upper hollow ferrous metal rod 65 (FIG. 3) and a lower hollow rod 67 (FIG. 2) connected thereto and extending upwardly and downwardly therefrom, respectively. Hollow rods 65, 67 have central bores 69, 71 therein, respectively, which are coaxial and in communication with one another creating a common central bore from the upper end of rod 65 to the lower end of rod 67.

Rod 67 extends through a central opening in flange plate 51 and a central opening in plate 59 into bore 73 in base 55, and is lowerable through hole 37 into the interior of tube 1. A seal member 75, which may be a Teflon, spring-loaded, cup-type seal, is disposed around rod 67 in a groove 77 in the flange plate. A gland nut 79 is screwed into a threaded box portion 81 in the upper surface of the flange plate for retaining seal member 75. A rod wiper ring 83 is disposed in a groove 85 around rod 67 below seal member 75.

Non-magnetic sensing rod 33 is slidably received in the common bore of hollow rods 65, 67. Rod 33 may be made of any suitable non-magnetic material, for example, stainless steel. Rod 33 includes an axial groove 35 the entire length thereof to permit fluid from tube 1 to communicate with the upper end of rod 33 thereby pressure balancing rod 33. Sensing head or tip 39 is attached to the lower end 34 of rod 33, as by insertion of rod 33 into a blind axial bore in the upper surface of tip 39 and a spring pin 87 disposed in a transverse bore through rod 33 and tip 39. Head or tip 39 has a rounded lower surface 89 and a flat, annular upper surface forming shoulder 91. Tip 39 may also be of stainless steel.

As shown in FIG. 3, a non-magnetic end cap 93 is secured to the upper end of upper hollow rod 65, as by screw threads 95 on the outer surface of rod 65 and the inner surface of cap 93. Cap 93 is made of suitable non-magnetic material, for example, stainless steel. Cap 93 has a lower bore 97 having threads 95 therein, an intermediate reduced diameter bore 99 above bore 97 forming shoulder 101 therebetween, and an upper reduced diameter blind bore 103 above bore 99. An o-ring seal 104 is disposed in a groove in the wall of bore 97 below shoulder 101 and sealingly engages rod 65. The upper end of rod 65 abuts shoulder 101 when cap 93 is screwed tight. A set screw 105 is disposed in a transverse threaded passage through cap 93 at its lower end for engaging rod 65 and preventing relative rotation between the cap and rod.

A hollow non-magnetic aluminum magnet holder 107 is disposed over, and secured to, the upper end of sensing rod 33 by a non-magnetic spring pin 109 disposed in a transverse bore through the walls of holder 107 and through rod 33. Holder 107 may be made of stainless steel where hostile fluids are being transported. Holder 107 and rod 33 are free to move in limited axial sliding fashion within the upper end of rod 65 and cap 93. Movement of rod 33 and holder 107 in a downward direction is limited by a shoulder 110 in the bore of rod 65 which abuts the lower end of holder 107. A magnet 111 is slidably housed inside holder 107 on top of rod 33, and a stainless steel return spring 113 is disposed between the upper end of magnet 111 and the end of upper blind bore 103.

A non-magnetic aluminum condulet 115, suitable for hazardous locations, is supported from the upper end of hydraulic cylinder 49 by a condulet bracket 117. A magnetically operated reed switch 119 is mounted inside condulet 115 and electrically connected to a remote signal detecting means (not shown). Condulet 115 is sometimes referred to as electrolet or switch housing. Switch 119 may be of any well known types which can detect a magnetic field.

In order to illustrate generally the operation of the first embodiment of the invention in situations both where a pig is present in tube 1 to be detected and where a pig is not so present, FIG. 2 is presented to show detector 31 prior to extension of rod 33 and lower rod 67 into the interior of tube 1. FIG. 3 is presented to show operation of the invention after extending rod 33 and lower rod 67 into the interior of tube 1, with no pig 3 in place to be detected. FIG. 4 is presented to show operation of the invention after extending rod 33 and lower rod 67 into the interior of tube 1, with a pig in place to be detected.

Prior to extending rod 33 and lower rod 67 into the interior of tube 1, that is, with rods 33, 67 in retracted position, the upper end of upper rod 65, cap 93, the upper end of rod 33 carrying magnet holder 107 and magnet 111 therewithin, and return spring 113 are all disposed above condulet 115 housing reed switch 119.

Referring first to the situation in which a pig is present to be detected, as shown in FIG. 2, operation of the invention is as follows. Starting from the retracted position of rods 33, 67, also shown in FIG. 2, hydraulic cylinder 49 is actuated to lower rod 67 into the interior of tube 1. Actuation of hydraulic cylinder 49 also lowers rod 65 along with rod 67, which in turn transports cap 93 and spring 113 downward toward the vicinity of reed switch 119. Rod 33, suspended from shoulder 110 through attached magnet holder 107, also moves downward, as does the magnet 111 resting on top of rod 33 and biased into holder 107 by spring 113, so that the magnet holder and magnet also approach the vicinity of reed switch 119 as sensing head or tip 39 approaches pig 3. The magnetic flux or signals of magnet 111 are shielded by upper rod 65 whereby reed switch 119 cannot detect the magnetic field of magnet 111. When the sensing head or tip 39 contacts pig 3, the pig prevents further downward motion of sensing rod 33 and tip 39, but lower rod 67 and upper rod 65 continue to move downward until the lower end 70 of rod 67 abuts shoulder 91 of tip 39. The apparatus is designed so that when such abutment occurs, the hydraulic cylinder reaches the bottom of its stroke, and the upper surface of end cap 93 is approximately at the same vertical height as the upper surface of condulet 115. As tip 39 just touches pig 3, magnet 111 has been transported adjacent to reed switch 119, but is still entirely housed in holder 107 and entirely within the upper end of ferrous metal upper rod 65. Thus, the magnetic lines of flux of magnet 111 are concentrated in the ferrous metal of the upper end of rod 65 which surrounds magnet 111, and cannot trip reed switch 119. Then, as the hydraulic cylinder 49 continues to move both hollow rods 65, 67 downward, and rod 33 is prevented from moving downward through contact of tip 39 with pig 3, the ferrous metal comprising the upper end of rod 65 begins to move downwardly away from magnet 111. As the end of rod 65 continues to move downwardly away from magnet 111, the magnetic flux of magnet 111 expands outwardly into the air, through non-magnetic end cap 93, through air gap 121, and through non-magnetic condulet 115 to actuate reed switch 119. In this position, shown in FIG. 4, return spring 113 is in compression, and operates to insure that magnet 111 returns into position surrounded by the ferrous upper end of rod 65 when the hydraulic cylinder 49 is subsequently actuated to retract rods 33, 67 from the interior of tube 1. Spring 113 overcomes any friction between rod 33 and rods 65, 67 which would tend to keep rod 33 from returning by gravity to its position suspended from shoulder 110 after such retraction. When reed switch 119 is actuated, an electrical signal is sent to the remote signal receiving location where the presence of the pig in tube 1 is thus reported and observed.

In the event a pig was not in position to be detected, rod 33 and tip 39 would not be restrained when hydraulic cylinder 49 completes its downward stroke. Under this condition, magnet 111 is transported downwardly past reed switch 119 while entirely surrounded by the ferrous metal of the upper end of rod 65, thereby keeping the magnetic flux concentrated in such ferrous metal and preventing the actuation of reed switch 119. No signal is sent to the remote location, and the absence of the pig can thus be observed. The final position of magnet 111 in this circumstance is illustrated in FIG. 3.

In sum, a positive switch closure is obtained when a pig is in position in tube 1, and no switch contact is obtained when the pig is not in the proper location.

As an aid in determining when the hydraulic cylinder 49 is in its retracted position, an indicating means 123 may be connected to the cylinder, which means 123 is actuated upon retraction to send a signal to a remote location. Such an indicating means may be, for example, an Ortman explosion-proof "Dyna-Switch" which makes contact in the cylinder-retracted position.

The detectors 31 of the first embodiment of the invention offer maintenance or troubleshooting advantages over various prior art systems in that the mechanical action of cylinders 49 can be readily observed by the action of the clearly visible double-rod-end movements, and reed switch actuation can easily be caused by holding a small hand-held magnet in proximity of the condulet enclosing the reed switch without opening the cover or exposing any part of the electrical system.

Referring now to FIGS. 5, 6, and 7, a pig detector 125 according to a second embodiment of this invention is shown in detail. The second embodiment of the present invention illustrates a detector 125 used as a pig passage indicator. As shown in FIG. 5, a threadolet or base 127 is welded at 129 onto the top of a pipeline 131 around a hole 133 through the pipeline. Base 127 has a threaded box 135 in its upper end and a downwardly extending flared bore 137 below and in communication with box 135. A ferrous metal nipple 139 having threads on its upper and lower outer side surfaces is screwed into box 135 and extends upwardly therefrom. Nipple 139 has an upper bore 141 and a lower reduced diameter bore 143 below and in communication with bore 141, creating annular shoulder 145 therebetween. Lower bore 143 communicates with bore 137 of base 127.

A non-magnetic cap 147 made of, for example, stainless steel, is attached to the upper end of nipple 139 and includes a lower bore 149 having internally threaded portion 151 at its lower end for threaded engagement with nipple 139. Cap 147 further includes an upper reduced diameter blind bore 153 above bore 149.

A non-magnetic magnet housing 155 is slidably disposed in the bores 141, 143 of nipple 139, and extends upwardly at 140 from the upper end of nipple 139. Magnet housing 155 also extends downwardly past the lower end of nipple 139, through bore 137 of base 127, and through hole 133 into the interior of pipeline 131. A head or tip 159 having a rounded lower surface 161 is attached to lower end 157 of housing 155, as by a spring pin 163, and extends farther than end 157 into the interior of the pipeline.

Magnet housing 155 includes an upper portion 165 having an upper bore 167 therein, and a lower reduced diameter portion 169 forming shoulder 171 therebetween. Shoulder 171 limits the downward travel of housing 155 when it abuts shoulder 145 of nipple 139. A central passageway 173 extends downwardly in housing 155 from the lower end of blind bore 167, and communicates with a lower transverse port 175 above tip 159. Port 175 is in fluid communication with hole 133 below base 127 and, thus, with the interior of the pipeline. An upper transverse port 177 provides fluid communication between central passageway 173 of housing 155 and bore 141 of nipple 139. Thus, base 127, metal nipple 137, and cap 147 are filled with fluid from the pipeline and rod 33 is pressure balanced. Although base 127, nipple 137, and cap 147 bear this fluid pressure, they are of a compact size for hot-tapping a pipeline.

A magnet 179 is slidably disposed in upper blind bore 167 of magnet housing 155. A non-magnetic return spring 181, of stainless steel, for example, is disposed between the upper end of magnet 179 and the end of blind bore 153 in cap 147.

A condulet 183, suitable for hazardous locations, having a threadedly attached end cap 184, of non-magnetic material is mounted on cap 147 by means of a bracket 185. A magnetically actuated reed switch 187 is mounted within housing 183 on that side of housing 183 adjacent cap 147 and above magnet 179 when magnet 179 is in its lowered position. A terminal strip 189 is mounted on the inside of housing 183, straddling reed switch 187, by non-magnetic, e.g. aluminum, spacers 191 and non-magnetic, e.g. stainless steel, screws and washers 193, 195. Reed switch 187 is electrically connected to terminal strip 189, and then to a remote signal receiving means (not shown) by wires 197, 199 (FIG. 6).

In operation, when a pig passes under tip 159 from either direction, tip 159 contacts the pig and is lifted upwardly, pushing magnet housing 155 and magnet 179 upwardly with it toward the reed switch. When magnet 179 is lifted partially out of ferrous metal nipple 139, its magnetic lines of flux expand through the upper end of non-magnetic housing 155, non-magnetic spring 181, non-magnetic cap 147 and non-magnetic switch housing 183 to actuate reed switch 187. When the pig passes by tip 159, housing 155 and magnet 179 fall by gravity back into nipple 139, aided by return spring 181, until shoulder 171 abuts shoulder 145, re-enclosing magnet 179 in ferrous metal nipple 139 and deactivating reed switch 187.

Spring 181 is designed to require very low actuating force to hold the magnet in place and prevent the moving parts of the device from rattling during handling or shipping or in transport. When detecting the very soft foam pigs used in some applications, this spring can be removed, increasing the sensitivity of the device, and the weight of the moving parts 155, 159 and 179 alone will return them to their lowered positions after passage of the pig. This extremely low actuating force requirement allows the bi-directional detection of such foam pigs, whereas the various prior art devices fail in this respect. In addition, this embodiment of the invention is completely pressure balanced so that no element of the working mechanism is subject to a loading due to pressure in the pipeline. As in the case of the first embodiment of the invention, maintenance and troubleshooting are facilitated in this second embodiment since a hand-held magnet introduced in proximity of the reed switch will cause activation of the electrical contact without opening the cover or exposing any part of the electrical system. Moreover, due to the compact size of the pressure bearing portion of this embodiment of the invention, it can readily be installed on an operating pipeline using hot-tapping techniques. The reed switch, switch housing and switch housing mounting bracket are installed after the pressure bearing components are in place.

Figure 8:
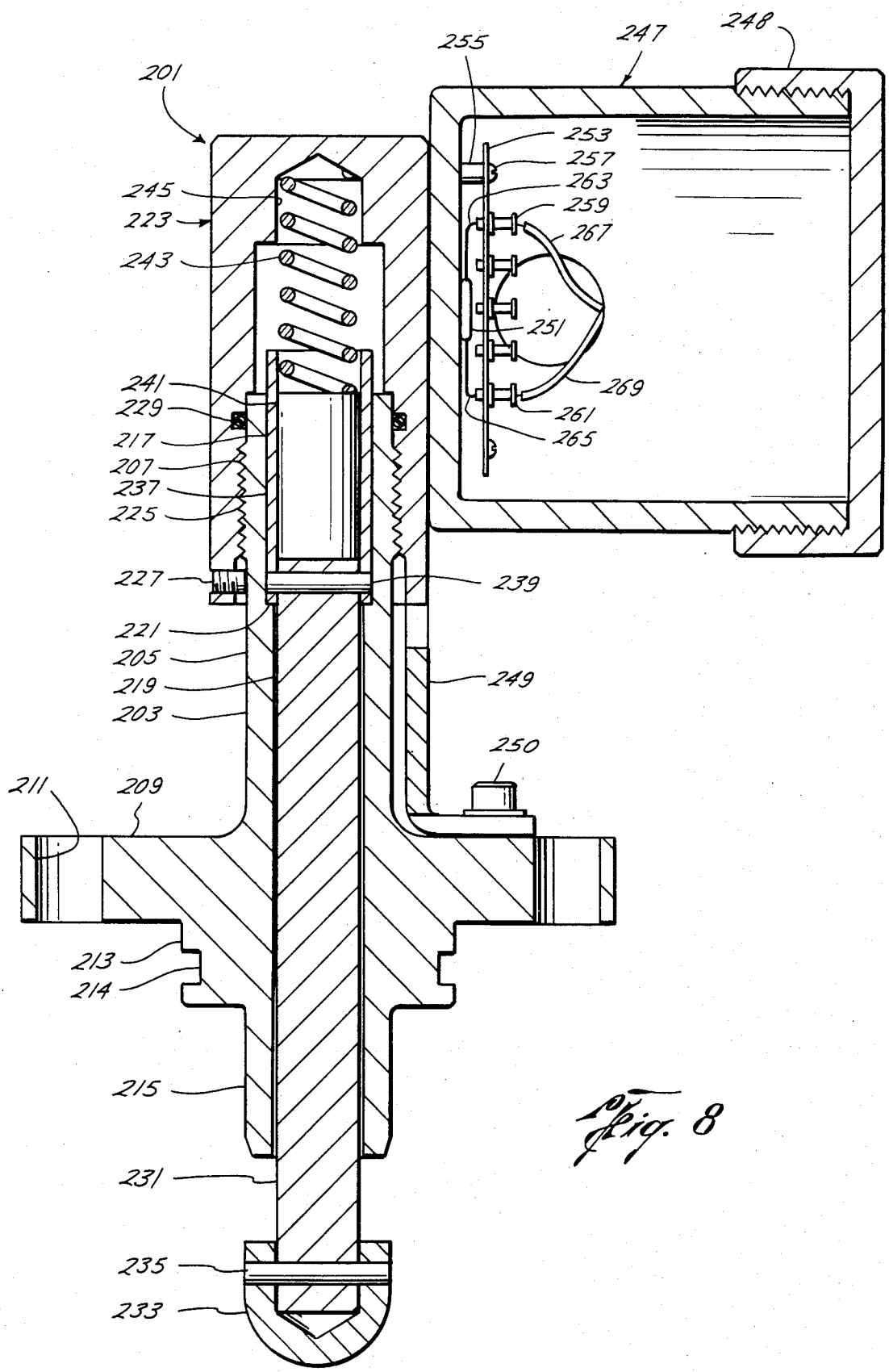
FIG. 8 is a vertical section of the third embodiment of the detector of the present invention for use on a pipeline for operation as a pig passage indicator.

Referring now to FIGS. 8 and 9, a third embodiment 201 of the pig detector of this invention is disclosed in detail. This embodiment, like the second embodiment, illustrates a detector to be used as a pig passage indicator. Since the working mechanism of this third embodiment is similar to that described above regarding the second embodiment, less detail by way of description is required. According to this embodiment, a ferrous metal housing 203 includes an upper extended neck portion 205 having external threads 207 near its upper end. At the base of neck portion 205, housing 203 widens into an annular flange 209, with a plurality of bores 211 therethrough near its radially outer periphery. Below flange 209, housing 203 includes a first cylindrical portion 213 having an annular groove 214 in its side surface, and a second cylindrical, reduced diameter portion 215 extending downwardly from first cylindrical portion 213. Housing 203 includes an upper bore 217, and a lower, reduced diameter bore 219 forming a central passageway through the housing from top to bottom. Shoulder 221 is formed between bores 217, 219.

An end cap 223 of non-magnetic material, e.g. stainless steel, having internal threads 225, is screwed onto the top of neck 205 and prevented from being unscrewed therefrom by a set screw 227. O-ring seal 229 disposed in a groove in the inner wall of cap 223 seals against neck 205.

A push rod 231 is slidably disposed in the passageway in housing 203, and extends downwardly below the lower end of second cylindrical portion 215. A head 233 is attached to the lower end of rod 231 by a spring pin 235.

A non-magnetic, hollow, magnet holder 237 is attached to the upper end of rod 231 by a non-magnetic spring pin 239. Magnet holder 237 rests upon shoulder 221 when in its lowered position. A magnet 241 is slidably disposed in holder 237, and a non-magnetic return spring 243, e.g. of stainless steel, is disposed between magnet 241 and the upper end of a blind bore 245 in cap 223.

A non-magnetic condulet 247 having a threadedly attached end cap 248 is attached to housing 203 adjacent cap 223 by means of a bracket 249 attached to flange 209 by cap screws 250, and to condulet 247 by cap screws 252 (FIG. 9). Reed switch 251 is mounted inside condulet 247 adjacent cap 223. A terminal plate 253 is mounted inside condulet 247 over reed switch 251 by means of non-magnetic spacers 255 and cap screws 257. Reed switch 251 is electrically connected to terminal plate contacts 259, 261 through leads 263, 265. Wires 267, 269 electrically connect contacts 259, 261 to a remote signal sensing means (not shown).

Detector 201 of this embodiment of the invention is installed on a pipeline to a base previously mounted thereon (not shown), as by bolts through bores 211, with head 233 extending into the interior of the pipeline a sufficient distance to be contacted by a pig passing through the pipeline under head 233. When a pig is disposed beneath head 233, head 233 contacts the pig and is lifted upwardly, pushing rod 231 upwardly with it. Rod 231 in turn pushes magnet 241 partially out of housing neck 205 against spring 243 and into the vicinity of reed switch 251. The magnetic flux is thus allowed to expand outwardly from its previous concentration in ferrous metal housing neck 205, and through non-magnetic spring 243, holder 237, cap 223, and switch housing 247 to actuate reed switch 251 and send the appropriate electrical signal to the remote signal receiving means.

While preferred embodiments of the present invention have been described in detail, such description should be considered to be illustrative only, since various modifications to the invention can be made by one skilled in the art without departing from its spirit. Therefore, the scope of the present invention should be ascertained only through reference to the appended claims.

We claim:

1. Apparatus for detecting a pig in a pipeline comprising:
   a shield disposed over an aperture in the wall of the pipeline;
   a member mounted within said shield and extending through the aperture into the pipeline;
   means disposed on said member for emitting signals;
   means disposed adjacent said shield for detecting said signals; and
   said shield preventing said detecting means from detecting said signals when no pig is in the pipeline below the aperture and permitting said detecting means to detect said signals when a pig is in the pipeline below the aperture.

2. The apparatus of claim 1 wherein said member is reciprocally mounted within said shield and has a portion thereof extending exteriorly of said shield upon the presence of a pig to permit said detecting means to detect said signals.

3. The apparatus of claim 1 wherein said signal means includes a magnet with a magnetic field which may be detected by said detecting means.

4. The apparatus of claim 3 wherein said detecting means includes a magnetically operated switch.

5. The apparatus of claim 1 further including remote signal receiving means for reporting a detection by said detecting means.

6. The apparatus of claim 1 further including means for maintaining said member within said shield until a pig is located in the pipeline below the aperture.

7. The apparatus of claim 1 further including a head mounted on that portion of said member extending into the pipeline for engaging the pig.

8. The apparatus of claim 1 further including means for pressure balancing said member.

9. Apparatus for detecting a pig in a pipeline, comprising:
   a housing mounted over an aperture in the wall of the pipeline;
   a hydraulic piston and cylinder mounted on said housing, said piston having a first and second conduit with a common bore extending therethrough, said first conduit extending into said housing and aligned with the aperture and said second conduit extending exteriorly of said cylinder;
   a non-magnetic rod received within said common bore and having a magnet disposed on its upper end;
   a non-magnetic end cap secured to the upper end of said second conduit and receiving said magnet;
   means disposed on said housing for detecting the magnetic field of said magnet;
   means for actuating said piston to move said piston downwardly, said first conduit and rod having a portion thereof passing through the aperture and projecting into the pipeline upon said downward movement;
   said cap being disposed adjacent said detecting means upon said downward movement; and
   the downward movement of said rod being arrested by the pressure of a pig in the pipeline with said second conduit continuing to move downward to expose the magnetic field of said magnet to said detecting means.

10. The apparatus of claim 9 wherein said magnet is disposed in a non-magnetic holder mounted on the upper end of said rod.

* * * * *